United States Patent
Wacker et al.

(10) Patent No.: US 9,400,901 B2
(45) Date of Patent: Jul. 26, 2016

(54) METHOD FOR OPERATING A COMMUNICATION SYSTEM

(71) Applicant: GIESECKE & DEVRIENT GMBH, Munich (DE)

(72) Inventors: Dirk Wacker, Munich (DE); Ullrich Martini, Munich (DE)

(73) Assignee: Giesecke & Devrient GmbH, Munich (DE)

( * ) Notice: Subject to any disclaimer, the term of this patent is extended or adjusted under 35 U.S.C. 154(b) by 0 days.

(21) Appl. No.: 14/442,822

(22) PCT Filed: Nov. 19, 2013

(86) PCT No.: PCT/EP2013/003493
§ 371 (c)(1),
(2) Date: May 14, 2015

(87) PCT Pub. No.: WO2014/079561
PCT Pub. Date: May 30, 2014

(65) Prior Publication Data
US 2015/0302230 A1    Oct. 22, 2015

(30) Foreign Application Priority Data
Nov. 21, 2012   (DE) .......................... 10 2012 022 735

(51) Int. Cl.
*G06F 21/00*    (2013.01)
*G06K 7/10*     (2006.01)
(Continued)

(52) U.S. Cl.
CPC ............ *G06K 7/10267* (2013.01); *G06F 21/50* (2013.01); *G06K 7/0008* (2013.01); *G06F 2221/034* (2013.01)

(58) Field of Classification Search
CPC .............................. G06F 21/50; G06K 7/0008
See application file for complete search history.

(56) References Cited

U.S. PATENT DOCUMENTS

2008/0268811 A1*  10/2008  Beenau .................. G06Q 20/32
                                                        455/406
2010/0009627 A1*  1/2010   Huomo ................ H04B 5/0031
                                                        455/41.1

(Continued)

OTHER PUBLICATIONS

Francis et al., "Practical NFC Peer-to-Peer Relay Attack Using Mobile Phones," International Association for Cryptologic Research, Apr. 23, 2010, pp. 1-15, vol. 20100428:135139.

(Continued)

*Primary Examiner* — Morshed Mehedi
(74) *Attorney, Agent, or Firm* — Workman Nydegger

(57) ABSTRACT

A method for operating a communication system comprises a transponder having at least one antenna, in particular in the form of a portable data carrier, and a reading device having at least one antenna. The reading device is configured to exchange data with the transponder. An exchange of data between the transponder and the reading device is possible within a predetermined range. A measurement and evaluation is effected of the time of a command transmitted from the reading device to the transponder and the receipt of a corresponding response of the transponder by the reading device. In so doing, a processing is effected of a card-individual length of time T_icc, wherein the card-individual length of time T_icc specifies how long the transponder takes for the receipt and the processing of a command received from the reading device and the sending of a corresponding response.

17 Claims, 2 Drawing Sheets

(51) Int. Cl.
*G06K 7/00* (2006.01)
*G06F 21/50* (2013.01)

(56) References Cited

U.S. PATENT DOCUMENTS

2011/0153820 A1* 6/2011 Atkinson ............. G06Q 20/027
709/224

2012/0249296 A1* 10/2012 Savry ................... G06K 7/0008
340/5.65

OTHER PUBLICATIONS

International Search Report for corresponding International PCT Application No. PCT/EP2013/003493, Apr. 7, 2014.

* cited by examiner

| Data length | T [s] | Deviation ε [s] | $T_0$ [s] |
|---|---|---|---|
| 8 Bytes | 0.008588 | 0.000269 | 0.008276 |
| 20 Bytes | 0.011449 | 0.000448 | 0.011080 |
| 64 Bytes | 0.02126 | 0.000422 | 0.020917 |
| 220 Bytes | 0.058041 | 0.000615 | 0.057600 |

Fig. 3

METHOD FOR OPERATING A COMMUNICATION SYSTEM

BACKGROUND

The invention relates to a method for operating a communication system. The communication system comprises a transponder having at least one antenna. The transponder can be designed in particular in the form of a portable, card-shaped data carrier. Further, the communication system comprises a reading device having at least one antenna, wherein the reading device is configured to exchange data with the transponder. An exchange of data between the transponder and the reading device is possible within a predetermined range. To secure the communication against a relay attack, a measurement and evaluation is effected of the time of a command transmitted from the reading device to the transponder and the receipt of a corresponding response of the transponder by the reading device.

To prevent a relay attack, a measurement of the signal travel time can be performed. The total travel time here is composed of the travel time of a signal (way out of a command and way in of a response) together with the time for receiving and processing the command and emitting the response. The total travel time then must not exceed a certain maximum value.

It is further known to verify, by means of the so-called "distance-bounding" protocol, an upper limit of the physical distance between a verifying unit (verifier V) and a proving unit (prover P). The method is based on the evaluation of the delay time between the emission of a challenge and the receipt of a response corresponding thereto. The delay time makes it possible for the verifying unit to compute an upper limit of the communication distance. The method is based on the circumstance that electromagnetic waves spread almost at light speed, but are never faster.

In a variant of this protocol, the verifying unit, for example a reading device, and the proving unit, for example a transponder, can share a common secret for a challenge-response authentication. Here, the transponder does not send the response to the reading device. Instead, the reading device asks for one or several parts of the response in random fashion, to which the transponder must respond within a time span. This procedure can be repeated in order to increase security. This variant is in principle a cryptographic protocol, wherein results must be presented within special time limits. This makes it harder for an attacker to perform a so-called relay attack, since the attacker cannot deliver the results of the challenge within the predetermined time. Time limits are necessarily exceeded here.

In contactless portable data carriers according to the standard ISO/IEC 14443, there is no possibility to perform the above-described "distance-bounding" protocol, so that a communication system of a portable data carrier and reading device cannot perform a recognition whether both communication partners are actually disposed within the provided communication range of approximately 10 cm, or whether, due to a relay attack, a communication of the data carrier takes place with a remote, contactless reading device, which is not desired by the owner of the data carrier. A realization of the distance-bounding protocol would result in an extension of ISO/IEC 14443, in order to be able to implement the very exact timing provisions for the response behavior of the data carrier.

SUMMARY

It is the object of the present invention to specify a method for operating a communication system by which a relay attack can be recognized reliably and/or can be fended off subsequently. In particular, this method should provide for a reading device to be able to judge the response time behavior of a transponder. In so doing, particularly no changes of the existing standard ISO/IEC 14443 should be required. A further object is to specify a corresponding communication system.

The invention suggests a method for operating a communication system comprising a transponder having at least one antenna, in particular in the form of a portable data carrier, and a reading device having at least one antenna. The reading device is configured to exchange data with the transponder. An exchange of data between the transponder and the reading device is possible within a predetermined range. A measurement and evaluation is effected of the length of time of a command transmitted from the reading device to the transponder and the receipt of a corresponding response of the transponder by the reading device. In so doing, a processing of a card-individual length of time takes place, the card-individual length of time specifying how long the transponder takes for the receipt and the processing of a command received from the reading device and the sending of a corresponding response. The measured length of time is evaluated in the reading device, making use of the card-individual length of time.

The suggested method makes it possible to recognize relay attacks. In so doing, no changes of a transponder configured in accordance with ISO/IEC 14443 need to be made. The only precondition for performing the method is that the reading device can effect a length-of-time measurement. The method makes it possible to achieve a high exactness of recognizing a relay attack.

According to an expedient embodiment, the card-individual length of time is transmitted in the response of the transponder to the reading device for evaluation. The evaluation of the card-individual length of time makes it possible for the reading device to decide whether a relay attack is taking place or not.

According to a further embodiment, the reading device measures the length of time between the sending of the command and the receipt of the response of the transponder, wherein a relay attack can be inferred by means of the difference between the measured length of time and the card-individual length of time. When the difference is larger than a predetermined limit value, an attack can be inferred. According to this embodiment, in the method the pure travel time of the signal minus the processing time in the transponder is used for deciding whether an relay attack is taking place or not.

According to a further expedient embodiment, the card-individual length of time is transmitted in secured fashion from the transponder to the reading device. Thereby an authentic transmission of the card-individual length of time to the reading device is possible. The secure transmission can take place by means of a classic encryption mechanism, such as for example session keys or a Diffie-Hellman key exchange procedure or other type of secure authentication. Thereby a relay attacker cannot simply retrieve the card-individual length of time and employ it to fake a secure procedure to the reading device.

In a further embodiment the command is a challenge within the framework of a challenge-response authentication. The card-individual length of time is then transmitted to the reading device together with the response in reply.

Alternatively or additionally, the challenge can result in a change of the length of time ascertained by the reading device. It is thereby achieved advantageously that the execution time in the transponder can be influenced in targeted fashion by the transmitted challenge. Data values are utilized as challenge for this purpose. Thereby relay attacks are thwarted very effectively, if an encrypted channel cannot fend off this type of attack.

In an alternative embodiment of the invention, the method is performed multiple times. The length of time between the sending step and the receiving step is ascertained respectively and compared to a predetermined length of time as a limit value. This length of time is usually the minimum length of time required by the card for the command, plus the time required for the communication. Alternatively, instead of the minimum length of time, an average value of measured lengths of time is ascertained and employed as predetermined length of time. As average value, in particular the median of the measured lengths of time, the arithmetic average or the geometric average are suitable.

The ideal length of time therein is a value that is captured under test conditions or ideal conditions. The minimum length of time in contrast is the length of time measured for the existing communication system, which is consequently longer than the ideal length of time.

By the repetition of the method and the comparison to the minimum length of time or the predetermined length of time, the noise is removed from the signal or at least strongly reduced. One-off delays during transmission and/or one-off environmental influences which lead to an increase of the measured length of time, but are in principle not caused by a relay attack, can be filtered out by the formation of the average value over lengths of time already measured. In other words, the noise of the signal is reduced by forming an average value. Thereby smaller time tolerances can be assumed, the exceeding of which leads to the recognition of a relay attack. By this multiple repetition it is made much more difficult to perform a relay attack, and the communication method is greatly improved.

The number of repetitions is not limited, in order to significantly reduce the noise, one thousand and more repetitions are reasonable. It is also provided to abort the repetition of the method and to restart it. This is reasonable when the currently measured lengths of time in the individual repetitions deviate too strongly from each other, for example have a deviation of 30% or more.

According to the invention, it is further provided that the measured length of time depends on the length of the command, and for the length of the command the ideal length of time, minimum length of time and/or the median or the average of the measured lengths of time is/are stored in the reading device as reference value. Strong deviations from this reference value consequently indicate relay attacks at an early stage and additionally secure the communication system.

In an embodiment of the invention, the method has two steps, wherein in a first phase a secure channel is established between the reading device and the transponder, and in a second phase the measurement of length of time and evaluation of length of time is effected by means of the above-described method steps. By the establishment of a secure channel, the reading device command and the transponder response can be transmitted very fast, and deviations caused by authentications to be effected first are prevented. The method is thereby made more secure regarding the recognition of relay attacks.

In a preferred embodiment of the method, the software routines—also referred to as applets—are so configured in the transponder for processing the command that the processing time of the commands of the same data length is always constant. It is thereby ensured that the card-individual length of time is constant.

Additionally, the transponder can effect one or several measurements during the processing of the command received from the reading device and/or monitor one or several sensors in order to determine whether the current execution time of the processing deviates from the card-individual length of time. For this purpose for example an evaluation of timers, registers or sensors for the internal clock, an external clock or voltage can be effected, wherein subsequently a comparison of target values is performed.

Additionally, it can be provided that the measured value(s) is/are transmitted in the response to the reading device in addition to the card-individual length of time. Alternatively or additionally, the measured value(s) can be incorporated in the card-individual length of time.

The command transmitted from the reading device to the transponder can be an APDU command, by which the card-individual length of time is requested in targeted fashion by the reading device. Such a command then represents a special relay-attack verification command. It can be applied flexibly to different transponders and is standardized.

Alternatively, the command transmitted from the reading device to the transponder can be any desired APDU command. The employment of any desired command makes it possible to disguise a relay verification. In this variant it is expedient when the reading device and the transponder agree beforehand in reaction to which APDU command the card-individual length of time is transmitted in the response to the reading device.

The card-individual length of time can be measured or computed by the transponder. This measurement or computation can be effected once. The result of the measurement or computation can then be stored in a memory of the transponder. It is understood that the measurement or computation of the card-individual length of time must be effected in secure fashion, in order to be able to reliably prevent a relay attack in the future.

Alternatively, the card-individual length of time can be known and can be contained in a memory of the transponder. The card-individual length of time can for example be ascertained within the framework of a personalization and can be integrated securely in the transponder. Moreover, the length of time can be ascertained in a test phase during the manufacture of the transponder and can be integrated in the memory area.

The invention further suggests a communication system comprising a transponder having at least one antenna, in particular in the form of a portable data carrier, and a reading device having at least one antenna, wherein the reading device is so configured for exchanging data with the transponder that an exchange of data between the transponder and the reading device is possible within a predetermined range. The reading device is configured to effect a measurement and evaluation of the time of a command transmitted from the reading device to the transponder and the receipt of a corresponding response of the transponder. The reading device is further configured to process a card-individual length of time, wherein the card-individual length of time specifies how long the transponder takes for the receipt and the processing of a command received from the reading device and the sending of a corresponding response.

The communication system according to the invention has the same advantages as described above in connection with the method according to the invention.

The communication system can further be configured to carry out the above-described steps of the method.

BRIEF DESCRIPTION OF THE DRAWINGS

The invention will hereinafter be explained in more detail with reference to an exemplary embodiment in the drawing. The figures are described as follows.

DETAILED DESCRIPTION OF VARIOUS EMBODIMENTS

Figure 1:
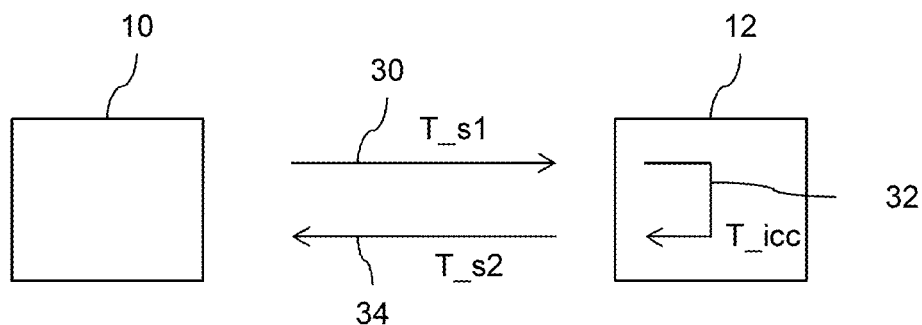
FIG. 1 a schematic representation of a communication system according to the invention, comprising a transponder in the form of a portable data carrier and a reading device, each having at least one antenna, FIG. 2 a flowchart illustrating the basic procedure for operating the communication system in FIG. 1, and FIG. 3 an overview of average lengths of time, card-individual lengths of time and deviations in dependence on the data length.

FIG. 1 shows a schematic representation of an embodiment of a communication system according to the invention. The communication system comprises a reading device 10 and a transponder 12, preferably in the form of a card-shaped portable data carrier. Such a transponder can be present for example in the form of a contactless smart card. Both the reading device 10 and the transponder 12 comprise respectively one antenna not represented in greater detail. The reading device 10 and the transponder 12 are preferably configured in accordance with the standard ISO/IEC 14443. When the transponder 12 and the reading device 10 are disposed within a predetermined range, an exchange of data can be effected between these two components. In the case of the so-called near field communication (NFC), a typical communication range is around 10 cm.

By the method described in more detail below, the reading device 10 and the transponder 12 are put in a position to judge a response time behavior within the framework of a communication and to thus perform the known "distance bounding". The method can be performed without changes of the reading device 10 and/or the transponder 12 being effected, leading to a deviation from the execution according to ISO/IEC 14443.

Figure 2:
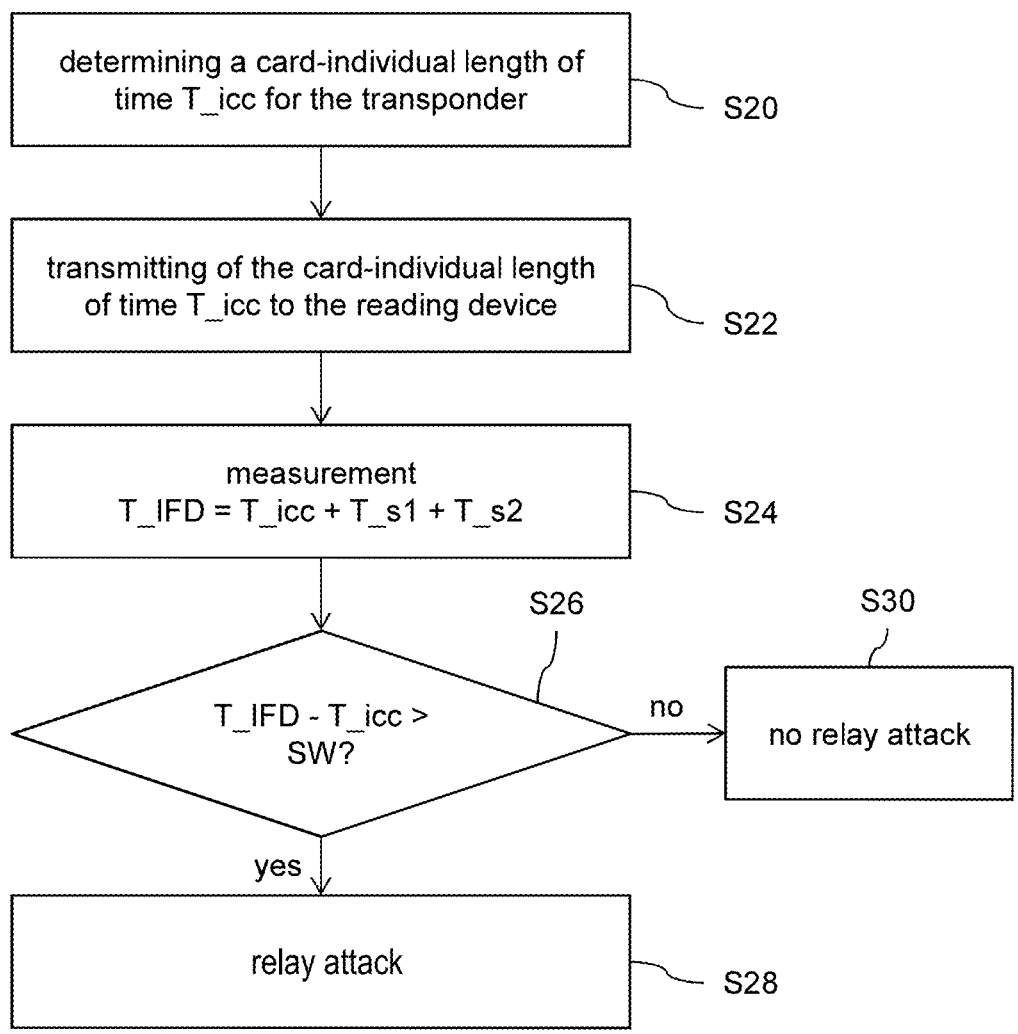

Within the framework of this method, which is represented in its basic form in FIG. 2, a measurement and evaluation takes place of the time of a command 30 (generally: a message) transmitted from the reading device 10 to the transponder 12 and the receipt of a corresponding response 34 of the transponder 12 by the reading device 10. For the transmission of the command 30 from the reading device 10 to the transponder 12 a time T_s1 is required. For the transmission of the response 34 from the transponder 12 to the reading device 10 a time T_s2 is required. For the receipt of the command, the processing of the former and the emission of the corresponding response in the transponder 12 (reference number 32), a card-individual length of time T_icc is required.

The card-individual length of time T_icc thus specifies the time that the transponder 12 can take between the receipt, the processing and the sending of the command 30. The determination of the card-individual length of time T_icc represents a first step S20 of the method according to the invention.

The card-individual length of time T_icc can be integrated securely in the transponder 12 for example within the framework of a personalization of the former. Likewise, the card-individual length of time T_icc can be ascertained securely in the transponder 12 itself. The ascertainment can be effected for example by a measurement. The determination of the card-individual length of time T_icc is preferably effected merely once, under conditions conforming to the standard. The card-individual length of time T_icc is then integrated in an internal memory of the transponder that is not represented in any more detail.

The card-individual length of time T_icc is transmitted (step S22) authentically, i.e. unchanged, to the reading device 10 in the response 34 of the transponder 12. Simultaneously to the emission of the command 30, the reading device 10 measures a length of time T_IFD between the sending of the command 30 and the receipt of the response 34 (step S24). The length of time T_IFD here is composed of the sum of T_s1, T_s2 and T_icc. By computing the difference between the length of time T_IFD and the card-individual length of time T_icc, the reading device 10 or the application software contained thereon can infer whether the transponder 12 communicates directly with the reading device 10 or whether a relay attack is taking place.

For this purpose a comparison is effected with a predetermined threshold value SW (step S26). When the difference is higher than the threshold value SW ("yes"), the communication with the contactless transponder 12 is aborted by the reading device 10. In this case, a relay attack is taking place (step S28). When the difference is lower than the threshold value SW ("no"), the communication with the contactless transponder 12 is continued by the reading device 10, since no relay attack is taking place (step S30).

For the authentic transmission of the card-individual length of time T_icc preferably a secure transmission is chosen. For this purpose for example the so-called secure messaging channel of the transponder can be employed. For the case that the secure transmission is relay-secure, the transponder only needs to transmit in secured fashion the card-individual length of time T_icc in its response to the reading device 10.

In order to request the card-individual length of time from the transponder 12, a special relay-attack verification command can be transmitted as command 30 from the reading device 10 to the transponder 12. Alternatively, a conventional APDU command can be employed within the framework of a classic or standardized request to the transponder in order to disguise the relay verification. In the former case, a random selection of any desired APDU command can be employed for this purpose.

The desired APDU command is agreed for example by the transponder 12 and the reading device 10 in prior steps, so that the transponder 12 recognizes the relay verification command and transmits the card-individual length of time T_icc in its response 34 to the reading device 10. Alternatively, the desired APDU command is not agreed beforehand, but the data structures transferred in the APDU command or the APDU response indicate that in the APDU command the length of time T_icc is requested or passed on. For example a special type-length-value, briefly TLV object is employed for this purpose.

Optionally, by the command 30 a challenge can be transmitted to the transponder 12, which is for example transmitted back in the response 34 together with the card-individual length of time T_icc to the reading device 10. Likewise, the challenge can cause a defined, changed time behavior of the command 30.

A further variation of the method consists in that, during the processing of the command 30, the transponder 12 effects one or several measurements and/or monitors one or several sensor(s) of the transponder in order to determine whether the execution time deviates significantly from the standard time, i.e. the card-individual length of time. This can be effected for example by evaluating timers/registers/sensors for the internal clock, the external clock, a voltage, etc., and comparing to respective target values. Optionally, the measured value(s) can be incorporated in the computation of the card-individual length of time T_icc and/or be returned in the response 34 to the reading device 10 in addition to the card-individual length of time.

In a second embodiment—not represented in a figure—, the method from FIGS. 1 and 2 is repeated multiple times. A reasonable number of repetitions is one thousand, in order to be able to filter out one-off errors and environmental influences that lead to deviations in the time measurement. Therein the method is divided into two phases, wherein in the first phase a secure channel is established. By establishing the secure channel, the responses of the transponder 12 can be effected very quickly. In particular, the measured time T' can be predicted very well. For establishing the channel, standard procedures such as secure messaging or Diffie-Hellman authentications can be applied. The establishment of the secure channel can be omitted when it is ensured that the method is not manipulated by a third party.

In the second phase of the method the actual time measurement T' is effected to recognize the relay attack in accordance with the methods described in FIGS. 1 and 2. In so doing, the measurements are repeated multiple times, the total of the measurements resulting in the second phase. The following applies: When the average length of time T can be predicted with a certain standard deviation, it is valid with a probability $p(\epsilon)$ for the currently measured length of time T':

$$T'=T_0+\epsilon$$

wherein the ideal length of time $T_0$ is the sum of T_icc, T_s1 and T_s2. $T_0$ therein has either been ascertained by means of the current combination of transponder and reading device under test conditions or is contained in the reading device 20 as a typical reference value.

The reading device 10 captures the current length of time T' for each repetition. When the ideal length of time $T_0$ is employed as reference value, it is verified whether each current length of time T' deviates from the ideal length of time $T_0$ within a difference $\epsilon$, for example 10%. When this is not the case, a relay attack is presumed and the communication is aborted. In an alternative embodiment, it is not the ideal length of time $T_0$ that is used as reference, but the minimum length of time T. When the minimum length of time T is more than 10% smaller than the actually measured length of time T', the method is likewise aborted and a relay attack is assumed. The minimum length of time T is replaced by the currently measured length of time T', and is fixed as the new minimum length of time T when the currently measured length of time T' is lower than the minimum length of time T used up to this point.

Instead of the minimum length of time T also an average value T, for example a median, can be formed over all lengths of time T' captured so far, and this average value T can be adopted as reference. This average value T is either applied after passing all repetitions of the method.

It results from this context that all additional activities of the relay attacker must be effected within the difference $\epsilon$, large spatial distances and additional equipment for forwarding the signal in particular lead to an exceeding of the difference $\epsilon$. Due to the strong time restrictions, a relay attack on the communication system is impossible.

In FIG. 3 the result of a test setup is documented. For this purpose a notebook having an operating system and a card reader 10 connected thereto and a contactless card as transponder 12 is analyzed in view of the lengths of time T, T' and $\epsilon$. The data lengths L of the commands 30 were varied in so doing. The card-individual length of time T_icc was implied to be constant in this setup. The command 30 of the respective data length L was respectively sent 1000 times and responded to by the transponder 12.

An implementation of the method in a communication system provides that the reading device 10 sends commands 30 to the card for such a time until the difference $\epsilon$ is within a defined range. When this is the case, confidential information can be exchanged, since it is ensured that the communication path is not forwarded and/or tapped.

Therein a relay attack can be considered as recognized when a predefined number of repetitions of the method according to the invention remains unsuccessful. The higher the number of repetitions is, the smaller can the defined range of the difference $\epsilon$ be. The defined range of the difference $\epsilon$ in the lengths of time represented in accordance with FIG. 3 is 0.1 milliseconds for example, whereby already the distance between the reading device and the transponder can be limited to 1 km to 10 km due to the signal travel time.

The method can be improved significantly when small real-time operating systems are employed.

In an alternative embodiment—likewise not represented in the figures—, a command is sent to the transponder 12, which is processed by the transponder. The command, also referred to as start command, prompts the transponder 12 to start processing an endless script. Simultaneously with the start command, the reading device 20 likewise starts processing the endless script in the reading device 20. At a desired point in time after starting the endless script, the reading device 20 stops the endless script. Simultaneously with the stopping of the endless script, the reading device 20 sends a second command, also referred to as stop command, to the transponder 12. After receipt of the stop commend, the transponder likewise stops the processing of the endless script and sends a response to the reading device with the current value computed as the last value in the endless script or a comparable parameter documenting the chronologically last processing status of the script. This parameter is evaluated in the reading device and compared to a comparative parameter in the reading device 20. When the parameter/value is matching within certain limits, it is ensured that no relay attack is taking place. The endless script is a constant addition of a random number to itself for example. Alternatively, complex scripts are conceivable, the stopping of which delivers a result at the time of stopping.

For detecting a relay attack, the method according to the invention thus utilizes the pure travel time of a signal emitted and received again by the reading device 10 minus a known computing time of the transponder.

The suggested method can be implemented in a very simple fashion. It puts reading devices in a position to recognize relay attacks with NFC-capable terminals reliably and with great exactness. No changes of ISO/IEC 14443 are required in so doing. It is merely a precondition that the contactless reading device must be able to effect a time measurement.

LIST OF REFERENCE NUMBERS 10 reading device
12 transponder
30 command
32 receipt, processing and sending of a response
34 response
S20 method step
S22 method step S24 method step
S26 method step
S28 method step
S30 method step
T_icc card-individual length of time
T_s1 time for processing and transmitting the message 30
T_s2 time for transmitting and evaluating the response 34
T' currently measured length of time
T average and/or minimum length of time
$T_0$ ideal length of time
$\epsilon$ time difference between T' and $T_0$
L data length of the command

The invention claimed is:

1. A method for operating a portable data carrier comprising a transponder having at least one antenna, and a reading device having at least one antenna, wherein the reading device is configured to exchange data with the transponder, wherein an exchange of data between the transponder and the reading device is possible within a predetermined range, having the method steps of:
sending a command from the reading device to the transponder;
processing the command in the transponder with generating a response to the command by the transponder;
receiving the response of the transponder in the reading device, wherein:
a length of time between the sending step and the receiving step is measured in the reading device, wherein the processing step is effected within a card-individual length of time and the card-individual length of time specifies how long the transponder takes for the receipt and the processing of a command received from the reading device and the sending of a corresponding response, wherein the card-individual length of time is transmitted in the response of the transponder to the reading device for evaluation; and
the measured length of time is evaluated in the reading device, wherein the card-individual time is employed for evaluating the measured time.

2. The method according to claim 1, wherein the card-individual length of time is transmitted in the response of the transponder to the reading device for evaluation.

3. The method according to claim 1, wherein, by means of the difference between the measured length of time and the card-individual length of time, a relay attack is inferrable.

4. The method according to claim 1, wherein the card-individual length of time is transmitted in secured fashion from the transponder to the reading device.

5. The method according to claim 1, wherein the command is a challenge, and the card-individual length of time is transmitted together with the response to the reading device, forming the response.

6. The method according to claim 5, wherein the challenge results in a change of the length of time ascertained by the reading device.

7. The method according to claim 1, wherein the method is executed multiple times, and the currently measured length of time is compared to a predetermined length of time, in particular a minimum length of time, as limit value.

8. The method according to claim 1, wherein the measured length of time depends on the data length of the command, and the length of time predetermined for the length of the command, in particular a minimum length of time, is stored as a reference value in the reading device.

9. The method according to claim 1, wherein the transponder effects one or several measurements during the processing of the command received from the reading device and/or monitors one or several sensors of the transponder in order to determine whether the execution time of the processing deviates from the card-individual length of time.

10. The method according to claim 9, wherein the measured value or values is/are transmitted in the response to the reading device in addition to the card-individual length of time.

11. The method according to claim 9, wherein the measured value or values are incorporated in the card-individual length of time.

12. The method according to claim 1, wherein the command transmitted from the reading device to the transponder is an application protocol data unit (APDU) command by which the card-individual length of time is requested.

13. The method according to claim 1, wherein the command transmitted from the reading device to the transponder is any desired APDU command.

14. The method according to claim 13, wherein the reading device and the transponder agree beforehand in reaction to which APDU command the card-individual length of time is transmitted in the response to the reading device.

15. The method according to claim 1, wherein the transponder measures or computes the card-individual length of time.

16. The method according to claim 1, wherein the card-individual length of time is known and is contained in a memory of the transponder.

17. A portable data carrier comprising a transponder having at least one antenna, and a reading device having at least one antenna, wherein the reading device is so configured to exchange data with the transponder that an exchange of data between the transponder and the reading device is possible within a predetermined range, wherein the reading device is configured to
effect a measurement and evaluation of the time of a command transmitted from the reading device to the transponder and the receipt of a corresponding response of the transponder,
process a card-individual length of time, wherein the card-individual length of time specifies how long the transponder takes for the receipt and the processing of a command received from the reading device and the sending of a corresponding response, and wherein the card-individual length of time is transmitted in the response of the transponder to the reading device for evaluation.

* * * * *